Sept. 13, 1932.  J. DAWE  1,876,628

TRACTOR WHEEL

Filed Oct. 12, 1926

INVENTOR:
Joseph Dawe
BY Ruege, Boyer & Bakelar
ATTORNEYS.

Patented Sept. 13, 1932

1,876,628

UNITED STATES PATENT OFFICE

JOSEPH DAWE, OF HYDE PARK, LONDON, ENGLAND

TRACTOR WHEEL

Application filed October 12, 1926, Serial No. 141,053, and in Great Britain October 16, 1925.

This invention relates to wheels for use on tractors and all vehicles and apparatus which it is desired to move across soft and broken ground and is particularly applicable to vehicles for use on arable land.

One of the difficulties experienced in such operations consists in the effect of the wheels in pressing down and hardening the surface which it is usually desired to keep soft and pliable, and one object of the present invention is to construct a wheel which shall carry the weight of the vehicle directly on to the subsoil without pressing down and hardening the surface soil. Another object of this invention is to secure a better driving grip on the ground than is possible with existing forms of wheels for such purposes.

In carrying this invention into effect I construct a wheel the outer periphery or tread of which is not one solid surface but takes the form of a series of narrow solid surfaces spaced one from another in any convenient way. The solid surfaces being as small in area as possible and the open spaces between them being as large in area as possible. A wheel having a tread so constructed will cut through the surface soil, and its narrow solid area will take a firm bearing on the subsoil and any soil which may adhere to the flat sides in the open spaces of the tread will be free to pass out readily towards the centre of the wheel and so back on to the land.

I construct such a wheel in a variety of ways but I prefer to do so by a series of rings or annular plates rigidly fixed concentrically by spokes or otherwise to the hub of the wheel. These rings or annular plates are not necessarily flat in the plane of rotation they may be curved or zigzagged or of sinuous or wave like formation; the object in each case being to increase the grip on the soil.

My invention may be more particularly understood by reference to the attached drawing where:—

Figure 1:
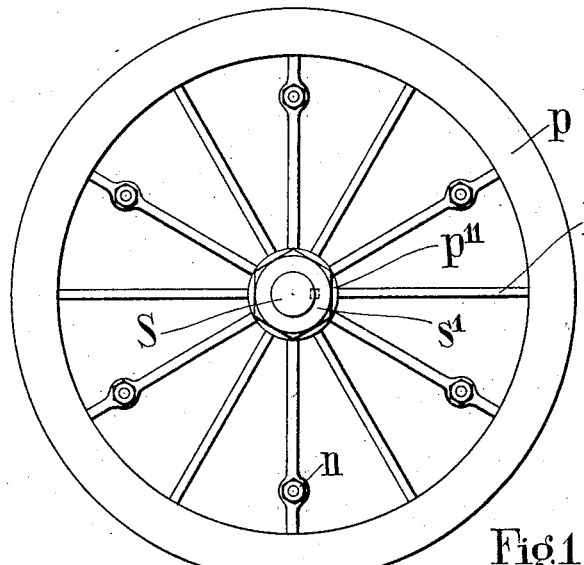
Fig. 1 shows a side elevation of a wheel made according to the present invention.

Referring now to the drawing:—I construct a series of independent rings or annular plates $p.p.p.$ each of which is united by spokes $p'$ to a boss or hub $p''$, each ring thus forming an independent unit upon the shaft S. I place a series of such rings on a shaft and hold these rigidly together by means of distance pieces $d$ $d'$ and a nut $n$ so that they form a wheel whose travelling face is represented by the narrow edges of the rings spaced one from another a distance such as may be desired. This composite wheel is then rigidly splined to the shaft for rotation therewith, as shown in the drawing. The face of such a wheel being composed of narrow edges separated one from another the wheel is free to cut through the loose surface soil of a field and find its bearing in the harder subsoil.

Figure 2:
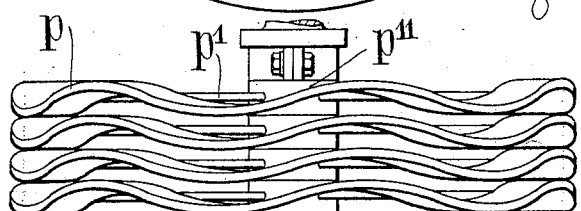
Fig. 2 shows an edge view of the same with annular plates of a sinuous formation.

I prefer to make the annular plates sinuous in the plane of rotation as shown in Fig. 2, and by this means I prevent the wheel slipping in heavy soil, but I sometimes make them flat in the plane of rotation and I sometimes make some sinuous and some flat.

Figure 3:
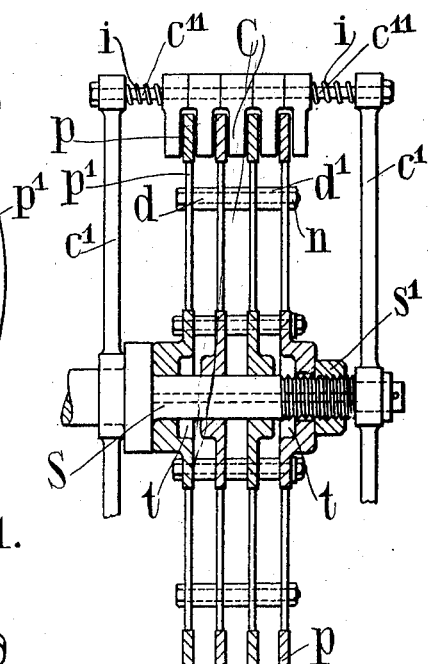
Fig. 3 is a sectional plan showing scrapers for clearing soil from the annular plates and a method of closing the plates together.

I make my annular rings adjustable on the shaft as shown in Fig. 3. In order to achieve this I find it convenient to form recesses $t.t.$ in the bosses of the two outer rings such that the bosses of the adjoining rings may take into the recesses for the purpose of closing up the rings one against another. By removing the distance pieces $d.d'$. the rings may be moved along the shaft and fixed together in contact one with the other by means of the nut $s'$. The wheel then becomes one with an approximately continuous or solid surface and is thus useful for rolling or for travelling along a road.

I arrange a series of scrapers $c.c.$ carried through the medium of suitable rods $c'.c'.$ from any convenient part of the machine to which the wheel may be attached and adapted to slide along the pins $c''.$ on which they are threaded and to be kept in adjustment one to the other by springs *i.i.*

Figure 4:
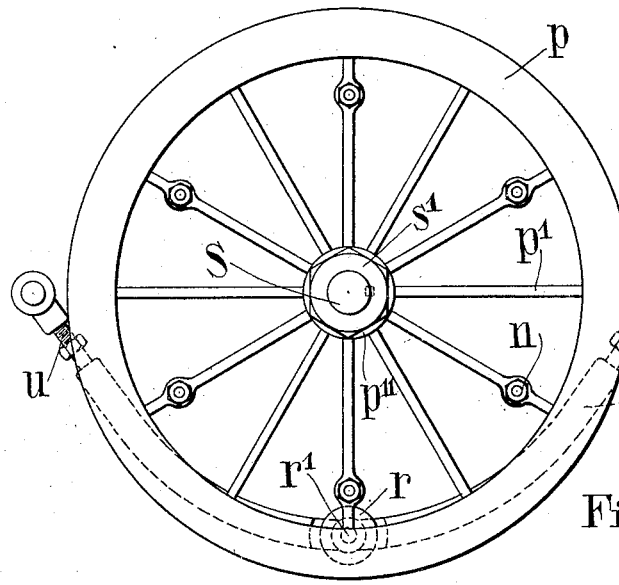
Figs. 4 and 5 show a system of adjustable roller scrapers for clearing the soil from the annular plates.
Figure 5:
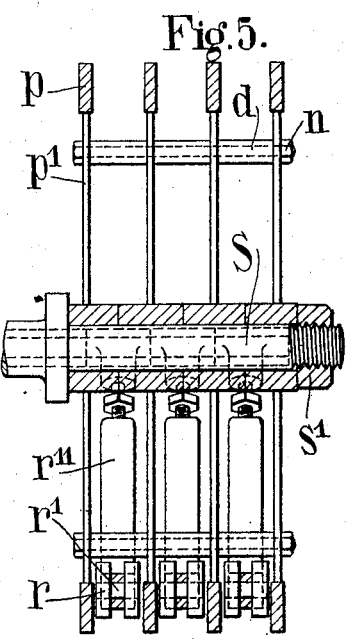

I sometimes use scrapers which are formed as rollers as shown at *r.r.* in Figs. 4 and 5. These roller scrapers I fix in such a position in relation to the wheel that they may scrape the adhering soil from the rings at the moment when they leave the ground and I allow the said roller scrapers to bear on the ground with a certain amount of pressure due to their own weight and the pressure of the links that carry them. By this means I strengthen the tenacity of the soil at the point where it is liable to cling to the wheel surface and I thus to a large extent obviate the clinging tendency. The rollers *r.r.* are carried by pins *r'.* fixed firmly in bearing rods *r''.r''.* which are themselves carried by any convenient part of the machine. These rods *r''.r''.* may be lengthened or shortened by the screw unions *u.u.* and by this means the rollers may be moved nearer to or further from the circumference of the rings as may be desired.

It will be obvious that many variations of arrangements and designs are possible in the carrying out of the purposes above described without departing from the spirit of this invention.

I do not always make my rings or annular plates all of the same diameter. I sometimes make some smaller in diameter than others so that they take a bearing on the soil later than those of larger diameter.

I sometimes fill in the space between the rings or annular plates with free moving rings carried on the distance pieces *d.d'.* The bearing holes in the rings being larger than the distance pieces in order that the rings during rotation may move into positions concentric to the main wheel and thus remove any adhering soil.

I sometimes use such a large number of rings that the wheel thus built up takes the form of a continuous series of narrow treads from one side of the machine to the other and in this way I produce a machine which when passed over a field makes a continuous series of ridges and in doing so cuts stubble, potato culms, couch grass and the like.

What I claim is:—

1. A driving wheel for tractors and similar agricultural implements, comprising a series of annular plates of sinuous formation in relation to the plane of rotation, means for uniting said plates to a common center in the hub of the wheel, and means for holding the plates in position relative one to another, the edges of said annular plates forming the entire tread of the wheel, said edges being adapted to cut through the surface soil.

2. A driving wheel for tractors and similar agricultural implements, comprising a series of annular plates of sinuous formation in relation to the plane of rotation, spokes uniting each of said plates to a central boss whereby each plate with its spokes and boss forms an independent unit, and means for securing said units in predetermined angular relation to each other, the edges of said plates forming the entire tread of the wheel, said edges being adapted to cut through the surface soil.

In testimony whereof I have signed my name to this specification.

JOSEPH DAWE.